United States Patent [19]

Keller

[11] Patent Number: 5,389,441

[45] Date of Patent: Feb. 14, 1995

[54] PHTHALONITRILE PREPOLYMER AS HIGH TEMPERATURE SIZING MATERIAL FOR COMPOSITE FIBERS

[75] Inventor: Teddy M. Keller, Alexandria, Va.

[73] Assignee: The United States of America as represented by the Secretary of the Navy, Washington, D.C.

[21] Appl. No.: 82,645

[22] Filed: Jun. 28, 1993

[51] Int. Cl.$^6$ .............................................. B32B 27/34
[52] U.S. Cl. ................................... 428/395; 427/385.5; 427/393.5; 427/407.1; 427/412.1; 428/375; 428/473.5; 428/902; 523/200
[58] Field of Search ................. 523/200; 428/375, 395, 428/902, 473.5; 427/385.5, 393.5, 407.1, 412.1

[56] References Cited

U.S. PATENT DOCUMENTS

| | | | |
|---|---|---|---|
| 4,408,035 | 10/1983 | Keller | 528/183 |
| 4,587,325 | 5/1986 | Keller | 528/172 |
| 4,619,986 | 10/1986 | Keller | 528/99 |
| 5,003,078 | 3/1991 | Keller | 548/406 |
| 5,004,801 | 4/1991 | Keller et al. | 528/360 |
| 5,159,054 | 10/1992 | Keller | 528/170 |

*Primary Examiner*—James J. Bell
*Attorney, Agent, or Firm*—Thomas E. McDonnell; Barry A. Edelberg

[57] ABSTRACT

Sized fibers, for use as reinforcements in high temperature polymeric composites, are prepared by coating the outside surface of the fibers with an amorphous, B-stage bisphthalonitrile prepolymer. The prepolymer may be prepared by curing a bisphthalonitrile monomer with an organic amine, an aromatic organic acid, a mineral acid, a Lewis acid or a salt of any of the above. Then, the fibers are coated by passage through an organic solution of the prepolymer. Either before or after completely curing the prepolymer coating on the fibers, the coated fibers are covered with a resin, for example, by passage through a solution or melt of a polyimide or bisphthalonitrile resin. If the phthalonitrile coating was incompletely cured prior to covering the phthalonitrile-coated fiber with the resin, the heat during the subsequent cure of the resin also completely cures the phthalonitrile coating. The resulting composite has excellent high temperature properties. In a preferred embodiment, the coated fibers are used to form a prepreg for usage in composite fabrication.

20 Claims, No Drawings

PHTHALONITRILE PREPOLYMER AS HIGH TEMPERATURE SIZING MATERIAL FOR COMPOSITE FIBERS

BACKGROUND OF THE INVENTION

1. Field of the Invention

The present invention relates generally to reinforcement fibers for use in composites and more particularly for sizing materials for reinforcing fibers in composites.

2. Description of the Background Art

Sizing materials are commonly used in reinforced composites to assure strong bonding between a reinforcing fiber (made of carbon or other suitable material) and the polymeric matrix material which holds the fibers in a particular configuration. For a reinforced composite material to have good high temperature strength, it is not sufficient for only the matrix and the reinforcing fibers to resist thermal decomposition. If sized fibers are being used, the sizing for the reinforcing fibers must also be resistant to thermal decomposition at high temperatures.

Current sizing materials, for example, epoxies and polyvinyl alcohol, cannot withstand the temperatures to which advanced high temperature composite materials are exposed. Thus, a polymeric composite may fail, on exposure to elevated temperatures, at the interface between the polymer matrix material and fibers sized with these materials, resulting in a reduction of mechanical properties. The failure or reduction in composite properties could be attributed to the decomposition of the sizing material at elevated temperatures, either in use or during a high temperature cure. DuPont attempted to develop a high temperature sizing material from highly aromatic thermoplastic polyimides, but was unsuccessful.

SUMMARY OF THE INVENTION

Accordingly, it is an object of this invention to improve the high temperature properties of fiber-reinforced composites.

It is another object of the present invention to prevent the decomposition of sizing materials at elevated temperatures during high temperature cure of a polymeric composite fabricated from sized fibers.

It is a further object of the present invention to permit the cure of a high temperature fiber-reinforced polymeric composite at temperature close to the decomposition temperature of the matrix, sizing material and/or fiber.

These and additional objects of the invention are accomplished by coating fibers with a film of a phthalonitrile prepolymer. Fibers are coated by passage through a dilute solution of a phthalonitrile prepolymer. Initially, an organic amine, phenol, strong organic acid, mineral acid, a Lewis acid, or a salt of any of the above, is added to a melt of a phthalonitrile monomer as a curing agent. The phthalonitrile monomer is thus converted into an amorphous prepolymer at a cure rate dependant upon both the amount of curing additive and the curing temperatures. The amorphous prepolymer is completely soluble in common organic solvents.

After adding the curing additive to the phthalonitrile melt, the resulting prepolymer may be advanced to any degree of viscosity desired before gelation. Depending on the application, the thus coated or sized fibers can be used for composite fabrication. Additionally, the thus coated fibers can be exposed to a temperature above the glass transition temperature ($T_g$) to further advance the cure of the thus deposited phthalonitrile sizing polymer film on the fibers, either to gelation or a point before or after gelation occurs.

DESCRIPTION OF THE PREFERRED EMBODIMENTS

The sizing scheme according to the present invention is outlined in the following flowchart:

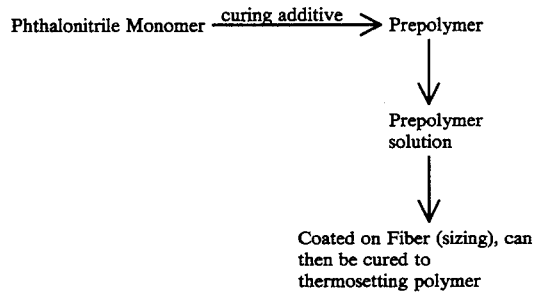

Bisphthalonitrile monomers are well-known in the art. Generally, any polymerizable bisphthalonitrile may be used as the starting monomer. Examples of polymerizable bisphthalonitrile monomers are given in U.S. Pat. Nos. 3,730,946; 3,763,210; 3,787,475; 3,869,499; 3,972,902; 4,209,458; 4,223,123; 4,226,801; 4,234,712; 4,238,601; 4,304,896; 4,315,093; 4,351,776; 4,408,035; 4,409,782; 5,003,078; and 5,159,054, all to Teddy M. Keller. All of these references are incorporated herein, for all purposes, in their entirety.

Similarly, any organic amine, phenol, strong organic acid, mineral acid, Lewis acid or salt of any of the above which polymerizes bisphthalonitrile monomers may be used as a curing agent in the present invention. A mixture of curing agents may also be employed.

The bisphthalonitrile polymer should be cured in the presence of an effective amount of the curing agent. Generally, the more curing agent that is used, the quicker is polymerization. Unfortunately, the presence of large amounts of unreacted curing agent in the cured polymer can degrade properties. Typically, the weight percent of the curing agent relative to the monomer is 1–40 weight percent, preferably 2–20 weight percent and more preferably about 5–10 weight percent.

As a more specific example, when the curing agent is an amine, the amount of curing agent employed is usually in about 1 to about 20 weight percent of the polymer mixture. Preferably, this amount is about 1 to about 15 weight percent. Most preferably this amount is about 5 to about 10 weight percent.

To cure the bisphthalonitrile, an effective amount of the curing agent and bisphthalonitrile are mixed at a temperature at which the mixture is molten, but below the decomposition temperature of the mixture. Examples of cure cycles for polymerization of phthalonitrile monomers with amine curing agents are 1)a two-part cure of 225°–260° C. for 5–20 hours and 300°–315° C. for 5–20 hours; 2)a three-part cure of 180°–240° C. for 2–16 hours, 240°–300° C. for 2–8 hours and 300°–315° C. for 4–20 hours; 3)a four-part cure of 200°–240° C. for 1–3 hours, 240°–270° C. for 2–4 hours, 270°–300° C. for 4–6 hours and 300°–315° C. for 4–20 hours. The preferred two-part cure is 240° C. for 6 hours and 315° C. for 16 hours. The preferred three-part cure is 240° C. for 4 hours, 280° C. for 4 hours and 315° C. for 16 hours.

The preferred four-part cure is 240° C. for 2 hours, 260° C. for 3 hours, 280° C. for 5 hours and 315° C. for 16 hours. The most preferred cure is the three-part cure. For organic acid curing agents, the preferred initial heating is at a temperature in the range of from about 200° C. to about 250° C. for 1 to 28 hours. The most preferred initial heating is at a temperature in the range from about 220° C. to about 240° C. for 4 to 8 hours. Initial heating is followed by more drastic heating at 280° to 320° C. for 5 to 28 hours, preferably at 300° to 315° C. for 5 to 24 hours. Because gelation results in an insoluble polymer, the prepolymers must not be advanced to gelation until after it has coated or sized a fiber. As used throughout the present specification and claims, coating a fiber with a prepolymer according to the present invention is equivalent to forming a sized fiber.

The curing agent and the monomer can be heated to any viscosity desired and quenched at a stage (i.e., the B-stage) before gelation occurs. The resulting prepolymer can be stored indefinitely at room temperature without further reaction.

The prepolymer is then dissolved in a common organic solvent to form a dilute (typically, about 1 to about 10% by weight or volume) solution of the prepolymer. This organic solvent may be polar, dipolar, aprotic or non-polar. Examples of solvents useful in practicing the present invention include methylene chloride, acetone, methylethylketone, dimethylsulfoxide, dimethylacetamide, and dimethylformamide. Of course, many other common organic solvents may be used.

A fiber is then coated with a film of phthalonitrile prepolymer or sized with phthalonitrile prepolymer by passage through the solution of the prepolymer, followed by removal of the solvent. If desired, the prepolymer thus coated on the fiber may then be additionally cured, typically in a heated chamber, to gelation. Alternatively, the coated fiber may be heated to a temperature above the glass transition point of the prepolymer (typically about 200° C.) and curing advanced to any stage before gelation.

The phthalonitrile-coated fibers, whether cured to gelation or not, may then be used to fabricate a composite. Any method of fabricated fiber-reinforced composites of having a polymeric matrix material may be used. For example, the fibers, after any cutting required to achieve the desired fiber length, may be mixed within, or otherwise covered by, a melt or solution of a polymeric resin, any undesired solvent removed, and the resin, with the fibers mixed therein, cured. If the phthalonitrile coating upon the sized fiber is incompletely cured prior to mixing with the resin, thermal curing of the resin will also completely cure the phthalonitrile coating.

The phthalonitrile-coated fibers are especially useful in the preparation of a prepreg. In the preparation of a prepreg, the sized fibers are passed through either the melt of, or a concentrated solution of, a polymeric resin. The polymeric resin or concentrated solution thereof covers the sized fibers, resulting in the deposition of a resin material onto the sized fibers. The resulting prepreg, formulated from a polymeric resin and sized fibers, is then fabricated, by conventional techniques, into composite components. If the phthalonitrile prepolymer coating or sizing on the fibers was only partially cured before prepregging, curing is generally completed during the heating which accompanies the processing of the matrix composite.

Regardless of the method of composite fabrication chosen, where phthalonitrile-coated fibers are exposed to a solution of a resin, the phthalonitrile coating is preferably completely cured (i.e., cured to gelation) prior to exposure of the fiber to the resin. If the phthalonitrile coating is incompletely cured (i.e., cured only to the B-stage), the resin solution may dissolve the phthalonitrile coating off of the fibers. Of course, this problem does not arise when fibers having a coating of completely cured phthalonitrile resin are exposed to a solution of resin. Nor does this problem arise when phthalonitrile-coated (completely or incompletely cured) are exposed to a melt, rather than a solution of a resin.

The phthalonitrile-sized or coated fibers according to the present invention may be mixed with any polymeric resin in the fabrication of fiber-reinforced composite. The polymeric resin which is cured to form the polymeric matrix of the composite may, but need not, be a bisphthalonitrile resin. For example, other suitable resins include epoxy resins and high temperature polyimide thermosetting resins such as PMR-15.

Amine curing agents are useful in the present invention are described, for example, in the above-mentioned U.S. Pat. Nos. 5,003,078; 4,408,035; 5,159,054, all o which are incorporated herein by reference, for all purposes, in their entirety. Typically, the preferred amine curing agents are of the general formula $H_2NYNH_2$ where Y is an aromatic group. Amidines, especially diamidines, are particularly useful. Mixtures of amine curing agents may be used.

Specific examples of amine curing agents useful in this invention are given below:

o-phenylenediamine
m-phenylenediamine
p-phenylenediamine
4,4'-diaminodiphenylpropane
4,4'-diaminodiphenylmethane (commonly named 4,4'-methylenedianiline)
4,4'-diaminodiphenyl sulfide (commonly named 4,4'-thiodiniline)
4,4'-diaminodiphenyl ether (commonly named 4,4'-oxydianiline)
1,5-diaminonaphthalene
3,3'-dimethylbenzidine
3,3'-dimethoxybenzidine
2,4-bis($\beta$-amino-t-butyl)toluene
bis(p-$\beta$-amino-t-butyl)ether
bis(p-$\beta$-methyl-o-aminopentyl)benzene
1,3-diamino-4-isopropylbenzene
1,2-bis(3-aminopropoxy)ethane
benzidine
m-xylylenediamine
p-xylylenediamine
2,4-diaminotoluene
2,6-diaminotoluene
1,3-bis(3-aminophenoxy)benzene
1,3-bis(4-aminophenoxy)benzene
1,4-bis(3-aminophenoxy)benzene
1,4-bis(4-aminophenoxy)benzene
bis[4-(3-aminophenoxy)phenyl]sulfone
bis[4-(4-aminophenoxy)phenyl]sulfone
4,4'-bis(3-aminophenoxy)biphenyl
4,4'-bis(4-aminophenoxy)biphenyl
2,2-bis[4-(3-aminophenoxy)phenyl]propane 2,2-bis[4-(4-aminophenoxy)phenyl]propane
4,4'-[1,4-phenylene(1-methylethylidene]bis(benzeneamine)
4,4'-[1,4-phenylene(1-methylethylidene]bis(2,6-dimethylbenzeneamine)
hexakis (4-aminophenoxy)cyclotriphosphazene.

The curing of phthalonitriles with organic and inorganic acids is described, for example, in U.S. Ser. No. 07/818,575, filed Jan. 9, 1992, to Keller et al., entitled "CURING PHTHALONITRILE RESINS." Any strong organic acid, or mixture of organic acids, may be used as a curing agent in the present invention. Typically, a strong organic acid will exhibit a $pK_a$ in water of less than about 1.0. More preferably, a strong organic acid exhibits a $pK_a$ in water of less than about 0.80. Strong organic acids include, for example, aromatic acids containing inorganic acidic substituents, such as the sulfonic group —$SO_3H$. Specific examples of such aromatic acids include p-toluenesulfonic acid, phenylsulfonic acid, 1-naphthalenesulfonic acid, 2-naphthalenesulfonic acid, 1,5-naphthalenedisulfonic acid, 2,6-naphthalenedisulfonic acid, 2,7-naphthalenedisulfonic acid, phenylphosphonic acid, phenylphosphinic acid, and phenylboric acid.

While any strong inorganic acid may be used, typical strong inorganic useful in the present invention include mineral acids such as hydrochloric acid, phosphoric acid, sulfuric acid, sulfonic acid and nitric acid, and mixtures thereof. Nitric acid, a strong inorganic acid, may be used as a curing agent in the present invention, but is not preferred because of its high oxidation strength.

The curing agent may also be a salt of any of the amines, acids or phenols discussed above. Exemplary curing salts for use according to the present invention include bis(3-aminophenoxy)-1,3-benzene p-toluene sulfonate, p-phenylenediamine p-toluenesulfonate, bis(4-aminophenyl)methane hydrochloride, and N-phenylbenzamidine p-toluene sulfonate.

The present invention may be used for sizing any fibers useful in reinforcing composites. Typical fibers which may be sized according to the present invention include carbon fibers, aramid fibers such as Kevlar®, glassy fibers (i.e., fibers which are predominantly $SiO_2$ also referred to as "$SiO_2$-based fibers") or non-glassy ceramic fibers (i.e., non-carbon ceramic fibers which are not $SiO_2$-based fibers). For the sake of convenience, the fiber upon which the phthalonitrile coating rests is referred to in the present specification, and the claims that follow, as a "base fiber."

The sizing material of the present invention can withstand extended use at temperatures of at least about 260°–371° C. Phthalonitrile resins have the following advantages as sizing materials:

(1) They are easily processable with no release of volatiles.
(2) They offer ideal rate control of the polymerization reaction.
(3) The B-stage prepolymer has an indefinite ambient shelf-life.
(4) They have thermal and oxidative properties superior to other commercially available thermosetting polymers and are stable in air at temperatures approaching 371° C.
(5) They retain mechanical properties after isothermal oxidative aging at elevated temperatures.
(6) They have superior fire resistance.
(7) They are processable to carbon with high char yield
(8) They are highly economical.

EXAMPLES

Having described the invention, the following examples are given to illustrate specific applications of the invention including the best mode now known to perform the invention. These specific examples are not intended to limit the scope of the invention described in this application.

EXAMPLE 1

To the melt of 4,4'-bis(3,4-dicyanophenoxy)biphenyl (1.0 gm) was added 1,3-bis(3-aminophenoxy)benzene (1.5 wt %) with stirring at 240° C. After stirring at 240° C. for 15 minutes, a small sample of the resulting prepolymer was found to be soluble in methylene chloride. The remaining prepolymer was cured by heating at 240° C. for 1 hour, at 280° C. for 1 hour, and at 315° C. for 6 hours. Gelation occurred during the heat treatment at 315° C. Further postcuring at 350° C. for 1 hour and at 375° C. for 2 hours resulted in the formation of a high temperature polymer that did not exhibit a glass transition temperature ($T_g$) and showed thermal and oxidative stability in excess of 400° C.

EXAMPLE 2

To the melt of 4,4'-bis(3,4-dicyanophenoxy)biphenyl (1.0 gm) was added 1,3-bis(3-aminophenoxy)benzene (5.0 wt %) with stirring at 240° C. Almost immediately, the sample started to quickly increase in viscosity. After 1 minute at 240° C., a small sample was removed and found to be completely soluble in methylene chloride. After 15 minutes, the phthalonitrile-amine sample had solidified a indicating a fast polymerization reaction.

EXAMPLE 3

To the melt of 2,2-bis[4-(3,4-dicyanophenoxy)-phenyl]hexafluoropropane (1.0 gm) was added 1,3-(3-aminophenoxy)benzene (5.0 wt %) with stirring at 240° C. The sample started to increase in viscosity very quickly. After 2 minutes at 240° C., a small sample was removed and found to be completely soluble in methylene chloride. Solidification of the remaining sample had occurred after 15 minutes.

EXAMPLE 4

To the melt of 2,2-bis [4-(3,4-dicyanophenoxy)-phenyl]propane (1.0 gm) was added methylenedianiline (2 wt %) with stirring at 200° C. After 20 minutes at 200° C., a sample was removed and found to be completely soluble in methylene chloride. The remaining sample was converted into a thermosetting polymer by heating at 200° C. for 1 hour, at 250° C. for 1 hour, and at 300° C. for 6 hours. Further postcuring at 350° C. for 1 hour and at 375° C. for 2 hours resulted in the formation of a high temperature polymer that did not exhibit a glass transition temperature ($T_g$) and showed thermal and oxidative stability in excess of 400° C.

EXAMPLE 5

To the melt of 4,4'-bis(3,4-dicyanophenoxy)biphenyl (1.0 gm) was added p-toluenesulfonic acid (4 wt %) with stirring at 250° C. After 5 minutes at 250° C., a small sample was removed and found to be completely soluble in methylene chloride. The remaining sample was converted into a thermosetting polymer by heating at 250° C. for 30 minutes and at 315° C. for 6 hours. Postcuring to 375° C. in an inert atmosphere increased the glass transition temperature ($T_g$) of the polymer.

EXAMPLE 6

A tow (0.9991 gm) of carbon fiber was weighed for phthalonitrile sizing. Two grams of phthalonitrile prepolymer prepared as in Example 1 was dissolved in 50 ml of methylene chloride. The solution was filtered into a large test tube. The tow of fiber was suspended by mean of a clip in the phthalonitrile solution for 1 hour. After drying under vacuum for 2 hours at 110° C., the phthalonitrile sized tow now weighed 1.0996 gm. The observed weight increase indicated that a film of phthalonitrile prepolymer had been deposited on the fibers.

EXAMPLE 7

Three pieces of unsized carbon cloth of dimension 4 inch × 4 inch were cut and wetted with a 2% solution of 2,2-bis[4-(3,4-dicyanophenoxy)phenyl]propane prepolymer, prepared as in Example 4, dissolved in methylene chloride. The methylene chloride quickly evaporated leaving behind a film of the phthalonitrile prepolymer on the surface of the fibers. The carbon cloth coated with the phthalonitrile prepolymer was used to fabricate a composite according to the following procedure: The dried carbon cloth weighed about 4 grams each. Nine grams of the phthalonitrile prepolymer were pulverized and used to prepare the composite. The composite was fabricated in a mold of dimensions 4 inch × 4 inch. A small amount of the prepolymer was sprinkled into the mold and a layer of carbon cloth was laid-down at a temperature of approximately 250° C. Approximately 3 grams of prepolymer were sprinkled over the cloth, which melted and readily soaked into the cloth. A second layer of carbon cloth was laid-down and 3 grams of prepolymer were sprinkled over the cloth. The third layer was laid-down and 2 grams of prepolymer were distributed over the cloth. The prepolymer flowed freely into the carbon cloth. A piece of peel ply was placed over the top layer followed by an aluminum plate. A small weight was then placed on top of the plate. The mold was then placed into a preheated vacuum oven and kept under a vacuum for 2 hours. At this time, the vacuum was removed. The temperature of the oven was then increased to 280° C. and the composite was fabricated by heating at 280° C. for 16 hours. Upon cooling, the composite was removed from the mold and inspected. The composite appeared to be tough and was void-free.

EXAMPLE 8

Five pieces of unsized carbon cloth of dimension 4 inch × 4 inch were cut and wetted with a 2% solution of 4,4'-bis(3,4-dicyanophenoxy)biphenyl prepolymer, prepared as in Example 1, dissolved in methylene chloride. The methylene chloride quickly evaporated leaving behind a film of the phthalonitrile prepolymer on the surface of the fibers. The carbon cloth coated with the phthalonitrile prepolymer was used to fabricate a composite according to the following procedure: The dried carbon cloth weighed about 4 grams each. Sixteen grams of phthalonitrile prepolymer were pulverized and used to prepare the composite. The composite was fabricated in a mold of dimensions 4 inch × 4 inch. A small amount of the prepolymer was sprinkled into the mold and a layer of carbon cloth was laid-down at a temperature of approximately 250° C. Approximately 3 grams of prepolymer were sprinkled over the cloth, which melted and soaked into the cloth. The second-third-fourth layers of carbon cloth were laid-down and 3 grams of prepolymer were sprinkled over the cloth. The fifth layer was laid-down and 3 grams of prepolymer were distributed over the cloth. The prepolymer flowed freely into each layer of carbon cloth. A piece of peel ply was placed over the top layer followed by an aluminum plate. A small weight was then placed on top of the plate. The mold was then placed into a preheated vacuum oven and kept under a vacuum for 2 hours. At this time, the vacuum was removed. The temperature of the oven was then increased to 280° C. and the composite was fabricated by heating at 280° C. for 6 hours and at 315° C. for 16 hours. Upon cooling, the composite was removed from the mold and inspected. The composite appeared to be tough and was void-free.

EXAMPLE 9

Five pieces of unsized carbon cloth of dimension 4 inch × 4 inch were cut for uses in the fabrication of a phthalonitrile-based composite. Sixteen grams of phthalonitrile prepolymer were pulverized and used to prepare the composite. The composite was fabricated in a mold of dimensions 4 inch × 4 inch. A small amount of the prepolymer was sprinkled into the mold and a layer of carbon cloth was laid-down at a temperature of approximately 250° C. Approximately 3 grams of prepolymer were sprinkled over the cloth. The second-third-fourth layers of cloth were laid-down and 3 grams of prepolymer were sprinkled over the cloth. The fifth layer was laid-down and 3 grams of prepolymer were distributed over the cloth. The prepolymer did not flow as freely into each layer of graphite cloth as when a film of phthalonitrile prepolymer was deposited on the surface of the fiber as in Example 7. A piece of peel ply was placed over the top layer followed by an aluminum plate. A small weight was then placed on top of the plate. The mold was then placed into a preheated vacuum oven and kept under a vacuum for 2 hours. At this time, the vacuum was removed. The temperature of the oven was then increased to 280° C. and the composite was fabricated by heating at 280° C. for 6 hours and at 315° C. for 16 hours. Upon cooling, the composite was removed from the mold.

EXAMPLE 10

Carbon fibers (AS-4) were coated with a thin coating or film of phthalonitrile prepolymer, prepared as in Example 2, by passing the fibers through a 1% solution of prepolymer dissolved in dimethylsulfoxide (DMSO). The fibers were passed through an oven to remove the solvent and wound onto a metal mandrel. The coated carbon fibers/mandrel were placed in an oven preheated to 240°–250° C. for 20 minutes to cure the phthalonitrile film. The resulting phthalonitrile sized fibers were used to prepare phthalonitrile prepreg formulated from a concentrated phthalonitrile prepolymer in dimethylacetamide. The prepreg was used to prepare phthalonitrile-based composite panels for testing.

Obviously, many modifications and variations of the present invention are possible in light of the above teachings. It is therefore to be understood that, within the scope of the appended claims, the invention may be practiced otherwise than as specifically described.

What is claimed is:

1. A coated fiber comprising a base fiber having a coating of an amorphous, B-stage bisphthalonitrile prepolymer on an outer surface thereof.

2. The coated fiber of claim 1, wherein said base fiber is resistant to decomposition at a temperature of 275° C.

3. The coated fiber of claim 2, wherein said base fiber is a carbon fiber or an aramid fiber.

4. The coated fiber of claim 1, wherein said amorphous bisphthalonitrile prepolymer is a reaction product of curing a mixture of bisphthalonitrile monomer and a curing agent selected from the group consisting of an organic amine, a salt of an organic amine, an aromatic organic acid, a salt of an aromatic organic acid, a mineral acid, a salt of a mineral acid, a phenol, a salt of a phenol, a Lewis acid and a salt of a Lewis acid.

5. The coated fiber of claim 4, wherein said the weight percent of the curing agent relative to the bisphthalonitrile monomer is about 1 to about 40%.

6. The coated fiber of claim 5, wherein said weight percent of the curing agent relative to the bisphthalonitrile monomer is about 1 to about 20%.

7. The coated fiber of claim 4, wherein said curing agent is an organic amine selected from the group consisting of:

o-phenylenediamine
m-phenylenediamine
p-phenylenediamine
4,4'-diaminodiphenylpropane
4,4'-diaminodiphenylmethane (commonly named 4,4'-methylenedianiline)
4,4'-diaminodiphenyl sulfide (commonly named 4,4'-thiodianiline)
4,4'-diaminodiphenyl ether (commonly named 4,4'-oxydianiline)
1,5-diaminonaphthalene
3,3'-dimethylbenzidine
3,3'-dimethoxybenzidine
2,4-bis($\beta$-amino-t-butyl)toluene
bis(p-$\beta$-amino-t-butyl)ether
bis(p-$\beta$-methyl-o-aminopentyl)benzene
1,3-diamino-4-isopropylbenzene
1,2-bis(3-aminopropoxy)ethane
benzidine
m-xylylenediamine
p-xylylenediamine
2,4-diaminotoluene
2,6-diaminotoluene
1,3-bis(3-aminophenoxy)benzene
1,3-bis(4-aminophenoxy)benzene
1,4-bis(3-aminophenoxy)benzene
1,4-bis(4-aminophenoxy)benzene
bis[4-(3-aminophenoxy)phenyl]sulfone
bis[4-(4-aminophenoxy)phenyl]sulfone
4,4'-bis(3-aminophenoxy)biphenyl
4,4'-bis(4-aminophenoxy)biphenyl
2,2-bis[4-(3-aminophenoxy)phenyl]propane
2,2-bis[4-(4-aminophenoxy)phenyl]propane
4,4'-[1,4-phenylene(1-methylethylidene]bis(benzeneamine)
4,4'-[1,4-phenylene(1-methylethylidene]bis(2,6-dimethylbenzeneamine)
hexakis (4-aminophenoxy)cyclotriphosphazene.

8. The coated fiber of claim 4, wherein said amine curing agent is present in said mixture in an amount of about 1 to about 15 weight percent of said mixture.

9. A coated fiber comprising a base fiber having a coating of a completely cured bisphthalonitrile polymer on an outer surface thereof.

10. A composite comprising:
a polymeric matrix;
at least one phthalonitrile-sized fiber reinforcing said matrix, said phthalonitrile-sized fiber comprising a base fiber and a coating of a completely cured bisphthalonitrile polymer on an outer surface thereof.

11. The composite of claim 10, wherein said base fiber is a carbon fiber or an aramid fiber.

12. The composite of claim 10, wherein said polymeric matrix is a cured, high temperature thermosetting polyimide resin.

13. The composite of claim 10, wherein said polymeric matrix and said phthalonitrile-sized fiber are resistant to decomposition at a temperature of 275° C.

14. The composite of claim 10, wherein said cured bisphthalonitrile polymer is produced by curing to gelation an amorphous B-staged bisphthalonitrile prepolymer that is formed as a reaction product of incompletely curing a mixture of a bisphthalonitrile monomer and a curing agent selected from the group consisting of an organic amine, a salt of an organic amine, an aromatic organic acid, a salt of an aromatic organic acid, a mineral acid, a salt of a mineral acid, a phenol, a salt of a phenol, a Lewis acid and a salt of a Lewis acid.

15. A method of sizing a base fiber, comprising the step of:
coating a fiber with a B-stage bisphthalonitrile prepolymer on an outer surface thereof
dissolving a B-stage bisphthalonitrile prepolymer in an organic solvent;
passing said base fiber through said solution to provide a coated fiber having a coating a B-stage prepolymer on an outer surface thereof.

16. The method of claim 15, wherein said B-stage bisphthalonitrile prepolymer is a reaction product formed by incompletely curing a mixture of a bisphthalonitrile monomer and a curing agent selected from the group consisting of an organic amine, an aromatic organic acid substituted with an inorganic acidic group, a mineral acid, a phenol and a Lewis acid.

17. A method of forming a composite including a polymeric matrix and at least one reinforcing fiber, comprising the steps of:
coating a base fiber with a B-stage bisphthalonitrile prepolymer on an outer surface thereof, thus forming a sized fiber;
covering said sized fiber with a resin material to form a fiber-containing mixture;
curing said fiber-containing mixture, thereby forming a fiber-reinforced composite.

18. The method of claim 17, further comprising the step of completely curing said phthalonitrile coating on said sized fiber before said covering step.

19. The method of claim 17, wherein said B-stage bisphthalonitrile prepolymer is incompletely cured during said covering step, and wherein said curing step also completely cures said B-stage bisphthalonitrile.

20. The method of claim 17, wherein said resin is a high temperature thermosetting polyimide resin.

* * * * *